Patented July 23, 1940

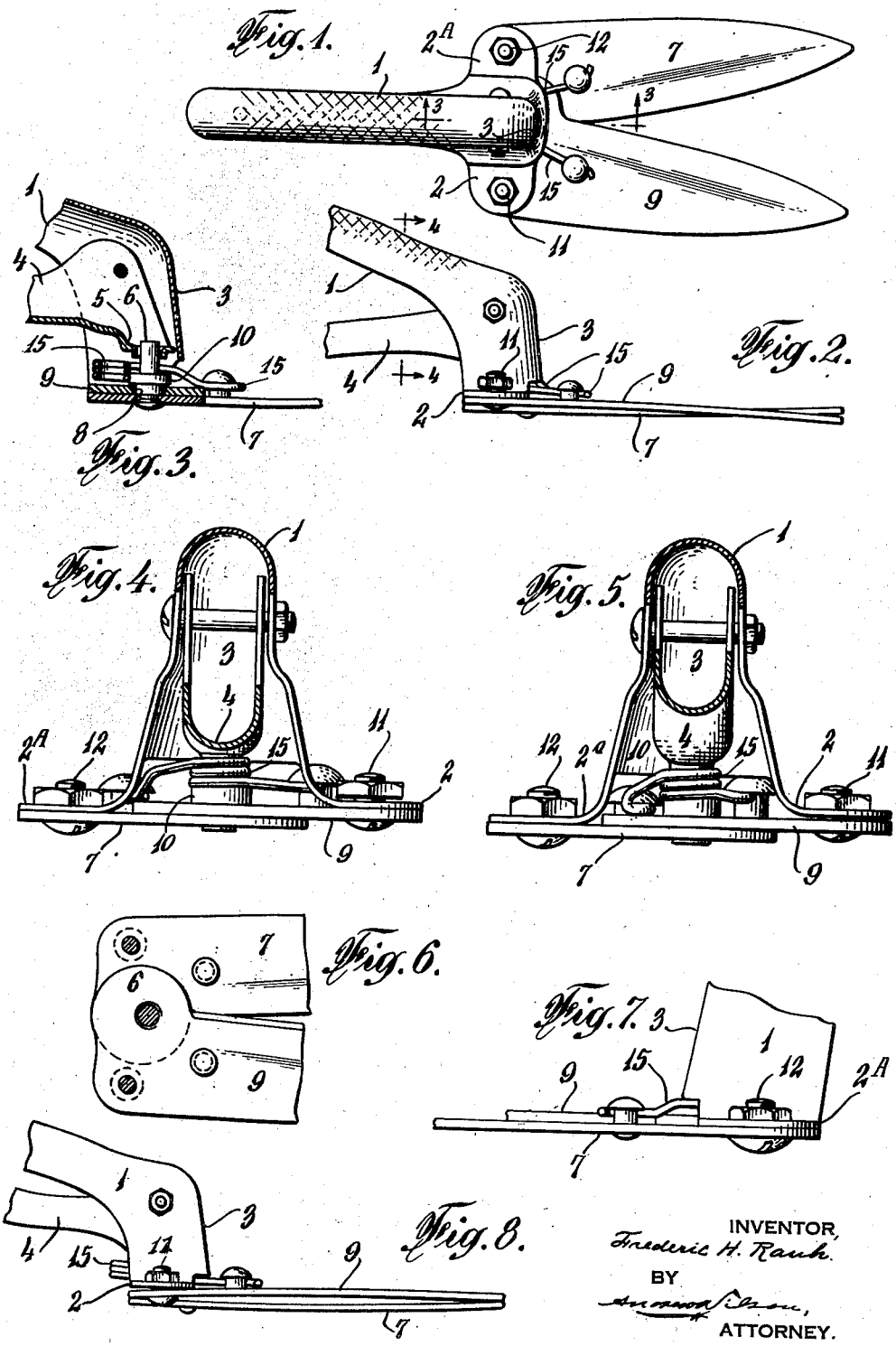

2,208,949

UNITED STATES PATENT OFFICE 2,208,949

GRASS SHEARS

Frederic H. Rauh, South Orange, N. J., assignor to J. Wiss & Sons Company, Newark, N. J., a corporation of New Jersey Application July 27, 1939, Serial No. 286,739

2 Claims. (Cl. 30—248)

My invention relates to a class of grass shears wherein a pair of blades are independently pivoted to a supporting frame, and the blades are opened and closed in cooperation with each other by the reciprocation of a pin or pivot element operatively engaging both blades.

Objects of my invention are to facilitate the cooperation of the cutting blades; to insure the clean, even shearing through the entire relative movement of the blades; to minimize the flexing or bending of the blades during the cutting movement; to avoid the spreading or contracting of the pivotal supports for the blades; to compensate for such changes of the pivotal parts and the bending of the blades by allowing one of the blades to rock slightly vertically into cooperative shearing relation to the other blade; to simplify construction and to reduce manufacturing expense; and to secure the other advantages hereinafter pointed out.

When the blades are carried on fixed pivots and are held so that they must oscillate in substantially parallel fixed planes, they must be bent lengthwise and allowed to flex longitudinally so as to give an approximately continuous shearing cut when the blades are closed. This requires careful adjustment and testing out of the blades, during assembling of the shears, by skilled workmen, which consumes time and adds to the expense of production; wherein in my improved shears no such nice adjustment of the blades is required, but the various parts may be finally assembled without working them out into smooth, effective cooperation, so as to give a satisfactory clean, continuous shearing cut.

In the drawing, in all of which similar parts are designated by similar reference numerals, Fig. 1 is a plan view; Fig. 2 is a side view looking up on Fig. 1, the ends of the handle and operating lever being broken off to save space; Fig. 3 is a longitudinal section taken on the line 3—3 of Fig. 1; Fig. 4 is a sectional view, on an enlarged scale, taken on the line 4—4 of Fig. 2 looking to the right, with the blades in the open position; Fig. 5 is a similar view with the blades in the closed position; Fig. 6 is a plan view, on the scale of Fig. 1, of the overlapping heels of the blades; Fig. 7 is an elevation, on the scale of Fig. 5, showing the normal, open relation of the left hand blade to its pivot support and to the right hand blade; and Fig. 8 is a view, similar to Fig. 2, but with the blades fully closed and on the scale of Fig. 1.

The handle 1 of the shears of the tool is formed of a channelled steel stamping, having outwardly extended, flanged legs 2, 2ª, and a closed front 3. Within this handle is pivoted an operating lever 4, the inner end 5 of which engages the upper end of a pin 6 fixed in the blade 7, passing up through an oversized hole 8 in blade 9, and provided with an integral flange 10 which holds the blades in freely assembled relation on the pin. The raising of the lever 4 retracts the pin 6, drawing the blades together, the oversized hole 8 allowing them to accommodate themselves between their pivot pins 11, 12 carried by the legs 2, 2ª, respectively, as the blades are closed.

The blade 7 moves in close relation to the under side of the flange leg 2ª without material vertical play, the pin 12 holding them in fairly close operative relation in parallel horizontal planes. But the flange of leg 2 is slightly deflected from the back forward, so that its plane slopes downwardly and forwardly in relation to the plane of flange 12; so that if the nut on pivot pin 11 is drawn tight, so that the shank of blade 9 is in close operative contact with it, the lower face of blade 9 will be deflected in relation to the upper face of blade 8 forcing the blades to bend or spring lengthwise in order to pass each other, and tending to damage the blades by their resulting angular contact.

To avoid this play of the shank of blade 9 on its pivot is provided for by not screwing down the nut on pivot pin 11, tightly, thus leaving space for the blade to tip in relation to its leg flange.

In normal open position the shank of blade 7 lying under the shank of blade 9, and being held against deflection, supports the shank of blade 9 snugly in position on its pivot 11, the inner edge of blade 9 lying over the inner edge of blade 7 in shearing contact and being pressed downward against it; and as the blades, which are bent slightly toward each other, are closed together, they would, if held in parallel, be forced to spring away from each other as the cutting point advanced toward and to the points of the blades, thus producing an increasing pressure between the blades and tending to wear the blades away near their edges so as to impair their cutting action and to increase the power needed to operate them.

However, in the present construction, the upper blade, due to the slant of the leg flange 2, and the vertical leeway of the shank on its pivot 11, can rock vertically, slightly, on its pivot, bearing upwards against the forward edge of the leg flange and rocking downward at its inner end within the play allowed by the slack of the pivot pin, so that the back end of the blade 9 drops away from the rear edge of the leg flange 2, as shown in Figs. 5 and 8, thus permitting the blade 9 to swing upward as the blades are closed, with little flexing of the blades, but with a maintained shearing contact between their edges at the cutting point, which contact is maintained by the pressure of the heel of the blade 7 against the heel of the blade 9. This gives a very satisfactory and efficient shearing action between the cutting edges of the cooperating blades. As is usual in shears of this general type, a spring 15 functions to keep the blades 7 and 9 normally open, and to return them to an open position after they have been closed.

By means of my improvements I produce a grass shears which avoids spreading or springing apart of the pivotal points of the blades, in which one blade moves in a practically uniform plane, while the other blade may rock vertically on its pivot to maintain its desired shearing contact with the first mentioned blade, thus avoiding material flexing of the blades, and diminishing wearing friction between them; and wherein the necessity of skilled labor in assembling the blades in the shears is materially reduced, and nicety of adjustment in the preliminary assembling of the blades with each other and working them into efficient cooperation is eliminated, and wherein a practical, working shears is produced, simple in construction and durable in operation, at materially reduced cost.

It is understood that details of construction, as by the use of mechanical equivalents and the like, may be varied without departing from the spirit of my invention or the scope of my claims.

Having thus described my invention what I claim and desire to secure by Letters Patent of the United States is:

1. In grass shears, the combination with a handled frame provided with blade supports disposed in relatively divergent planes, two cooperating blades pivoted respectively on said supports and one being longitudinally tiltable on its support, and means for producing cooperative reciprocation of said blades.

2. In grass shears, the combination with a handled frame provided with blade supports disposed in relatively divergent planes, two cooperating blades pivoted respectively on said supports and one being longitudinally tiltable over the forward edge of its support, and means for producing cooperative reciprocation of said blades in relatively varying planes.

FREDERIC H. RAUH.